W. J. BEVILLE.
ILLUMINATED SIGN OR ADVERTISEMENT.
APPLICATION FILED SEPT. 4, 1912.

1,239,154.

Patented Sept. 4, 1917.
2 SHEETS—SHEET 1.

WITNESSES:
John C. Sanders
Albert F. Heuman

INVENTOR:
Webster John Beville
BY
ATTY.

W. J. BEVILLE.
ILLUMINATED SIGN OR ADVERTISEMENT.
APPLICATION FILED SEPT. 4, 1912.

1,239,154.

Patented Sept. 4, 1917.
2 SHEETS—SHEET 2.

WITNESSES:
John C. Sanders
Albert F. Neuman

INVENTOR:
Webster John Beville
BY
ATTY

UNITED STATES PATENT OFFICE.

WEBSTER JOHN BEVILLE, OF HOLLOWAY, LONDON, ENGLAND.

ILLUMINATED SIGN OR ADVERTISEMENT.

1,239,154.     Specification of Letters Patent.     Patented Sept. 4, 1917.

Application filed September 4, 1912. Serial No. 718,440.

*To all whom it may concern:*

Be it known that I, WEBSTER JOHN BEVILLE, a subject of the King of Great Britain and Ireland, residing at 1 Stock Orchard Crescent, Holloway, London, England, have invented new and useful Improvements in Illuminated Signs or Advertisements, of which the following is a specification.

The invention relates to illuminated signs or advertisements consisting of a case or frame of box shape illuminated from within and having one or more of its faces fitted with a plate provided with parts of varying translucence or with translucent and opaque parts.

The object of the invention is to produce an illuminated sign of the above referred to construction which will be uniformly illuminated throughout its whole area, that is to say will not possess parts more highly illuminated than other parts and will further possess the additional advantage that only a small distance will intervene between its back and front or its two illuminated faces, as the case may be.

The invention consists essentially in providing the interior of a sign or advertisement of the above referred to type with a plurality of vertically supported reflecting members which are angularly disposed with respect to the sign-bearing plate or plates and consist of front members which are partly reflective and partly translucent and of an end member which is wholly reflective.

With a view to further enhancing the uniformity of illumination of the sign-bearing plate or plates of a sign or advertisement provided with the above described plurality of reflecting members a gauze screen or screens may be interposed between the sign-bearing plate or plates and the lamp or lamps illuminating the same, and a lens or lenses may be interposed between said lamp or lamps and the first of said reflecting members.

In order that my invention may be thoroughly understood I will now refer to the accompanying drawing which illustrates, by way of example, some of the many constructions which may be adopted in carrying out the invention.

Figure 7:
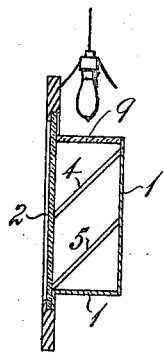
Figure 9:
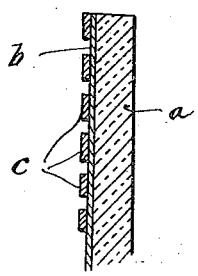
Figure 8:
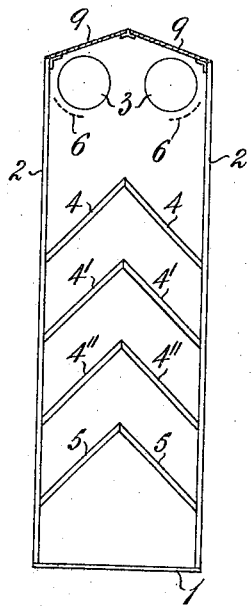

Figures 1, 2, 3, 4 and 5 are horizontal sections of signs or advertisements constructed according to the invention. Fig. 6 is a front elevation of the sign or advertisement illustrated by Fig. 5. Figs. 7 and 8 are vertical sections illustrating the application of the invention to what are known as day and night signs, that is to say signs or advertisements adapted to be illuminated either by natural or artificial light. Fig. 9 is a section illustrating a detail of construction.

Figure 1:
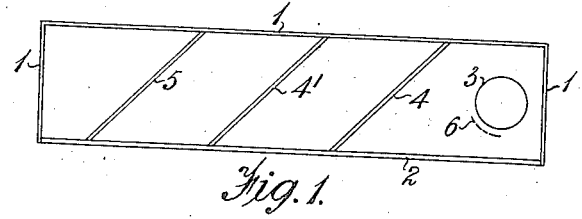

In all of the figures 1 indicates the sheet metal or other opaque walls of the boxes or cases of the signs or advertisements, 2 the plate or plates bearing the sign or advertisement and 3 the electric or other lamp or lamps by which the signs or advertisements are illuminated.

Figure 2:
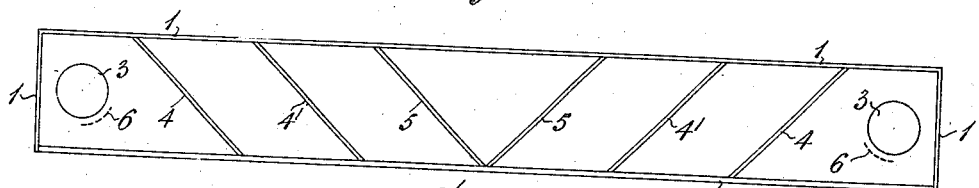

Referring first to Figs. 1 and 2, a sign or advertisement constructed in accordance with the invention may consist of a box or case 1 having sides and a back and also a top and bottom formed of sheet metal or other opaque material and a front plate 2 provided with the sign or advertisement. Such boxes or cases 1 could be illuminated either by a lamp 3 placed at one of the lateral extremities of the box or case, Fig. 1, or by a lamp 3 placed at each of the lateral extremities of the box or case, Fig. 2, and would be provided with vertically supported reflectors 4, 4' and 5 disposed at a suitable angle to the front plate 2. Of these reflectors the first two members, 4 and 4', would be partly reflective and partly translucent while the third member or members 5 would be entirely reflective, the whole arrangement being such that a part of the rays of light emanating from the lamp or lamps would be reflected by the member or members 4 and a part pass to the second member or members 4' while the rays of light falling on the latter would be partly reflected and partly allowed to fall on to the third member or members 5 which would reflect the whole of the incident rays. The even distribution of light effected by the use of the reflectors 4, 4' and 5 would be further enhanced by modulating by means of a gauze screen or screens 6 the rays of light emanating from the front of the lamp or lamps 3.

The partly reflective and partly translucent reflectors may be prepared in the following manner: Sheets of glass are cut to the required size and are covered on one of their faces with a suitable clear adhesive. Particles of bright metallic spangle are then evenly sprinkled on to said adhesive, while the latter is still in a moist condition. The quantity of metallic spangle which is sprinkled on to the coated sheets of glass will correspond to the relative degrees of reflectiveness and translucency which each member must possess, fewer particles of spangle being sprinkled on the sheet of glass which is to form the first member of a series of besprinkled reflectors than on the sheet of glass which is to constitute a second similar member, and more particles being sprinkled on to the sheet of glass which is to form the third member, if such third member is used.

Fig. 9 is a section of a partly reflective and partly translucent reflector prepared in the above described manner. In this figure $a$ is the sheet of plain glass, $b$ the adhesive applied thereto, and $c$ the particles of bright metallic spangle.

Figure 3:
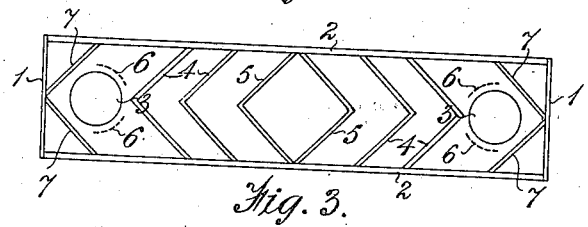

As shown in Fig. 3, the box or case 1 of a sign or advertisement made in accordance with the invention may be provided at both its front and back with a plate 2 bearing the sign or advertisement and be illuminated by lamps 3 placed at both of its lateral extremities. In this case each lamp 3 would preferably be provided with screens 6 and also with reflectors 7 located in rear of the lamps. Any suitable number of reflectors may be interposed between the lamps 3, the exact number and their nature depending on the length of the box or case. For instance partly reflective and partly translucent members 4 and wholly reflective members 5 could be used.

Figure 4:
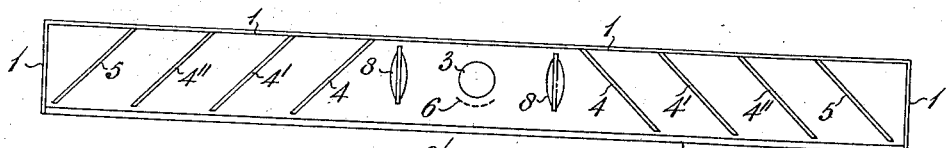

As shown in Fig. 4, the box or case 1 of a sign or advertisement constructed in accordance with the invention may be illuminated by means of a single lamp 3 located in the center of the box or case. In this instance it is better, especially if the box or case is of considerable length, as shown, to interpose lenses 8 between the lamp and the first of the reflectors on each side of it, as these lenses enable a greater number of reflectors to be used. The reflectors would be of the same nature as previously described, the members 4, 4' and 4'' being partly reflective and partly translucent and the last member 5 wholly reflective.

Figure 5:
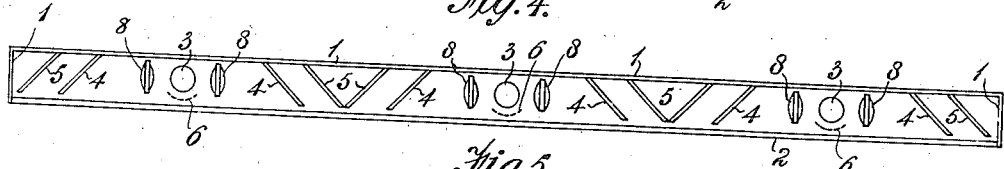
Figure 6:
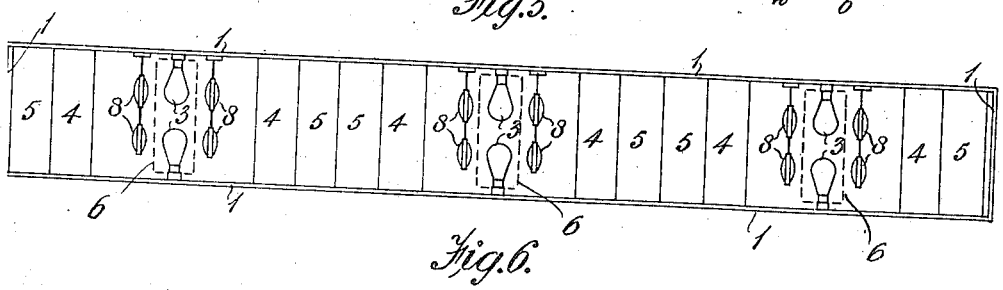

Again as shown in Figs. 5 and 6, a sign or advertisement constructed according to the invention could be provided with lamps 3 arranged in two rows, lenses 8 being, if desired, interposed between said lamps 3 and the first of the reflectors on each side of them and gauze screens 6 being placed in front of the lamps 3.

The arrangements of parts shown in horizontal section in Figs. 1, 2, 4 and 5 could be used in the case of signs or advertisements provided with both front and rear sign-bearing plates,—said parts being merely duplicated as will be readily understood.

The improvements forming the present invention may be applied to a sign or advertisement adapted to be illuminated by natural light as well as artificial light. Figs. 7 and 8 are sections of two of such signs or advertisements, Fig. 7 illustrating a small sign or advertisement adapted to be illuminated at night by a light or lamp located above it, and Fig. 8 a sign or advertisement provided in its interior with lamps 3. In both forms the signs would be provided with a glazed top 9. The remaining parts of said signs are similar to those already described and, as they are indicated by the same figures of reference as have been used in the previous instances, will be understood without further explanation.

Having now described my invention what I have invented and desire to secure by Letters Patent of the United States is as follows:—

1. A sign or advertisement consisting of a case constructed of opaque material and fitted with a sign-bearing plate, a source of light illuminating the interior of said case, and a plurality of vertically supported and suitably spaced reflecting members arranged at the sides of said source of light and angularly disposed with respect to said sign-bearing plate, said reflecting members comprising partly translucent and partly reflective members.

2. A sign or advertisement consisting of a case constructed of opaque material and fitted with a sign-bearing plate, a source of light illuminating the interior of said case, and a plurality of vertically supported and suitably spaced reflecting members arranged along side of said source of light and angularly disposed with respect to said sign-bearing plate, said reflecting members consisting of partly translucent and partly reflecting members and a wholly reflecting member.

3. A sign or advertisement consisting of a case constructed of opaque material and fitted with a sign-bearing plate, lamps in the interior of said case, plain reflectors disposed on one side of said lamps, and a plurality of vertically disposed and suitably spaced reflecting members located on the side of the lamps opposite to said plain reflectors and angularly disposed with respect to said sign-bearing plate, said reflecting members consisting of partly translucent and partly reflective members and a wholly reflecting member.

In testimony whereof I have signed my name to this specification in the presence of two subscribing witnesses.

WEBSTER JOHN BEVILLE.

Witnesses:
ARTHUR F. ENNIS,
O. J. WORTH.